July 16, 1929.  P. C. SMITH ET AL  1,721,139
BEEF CHILLING RACK
Filed Oct. 6, 1928
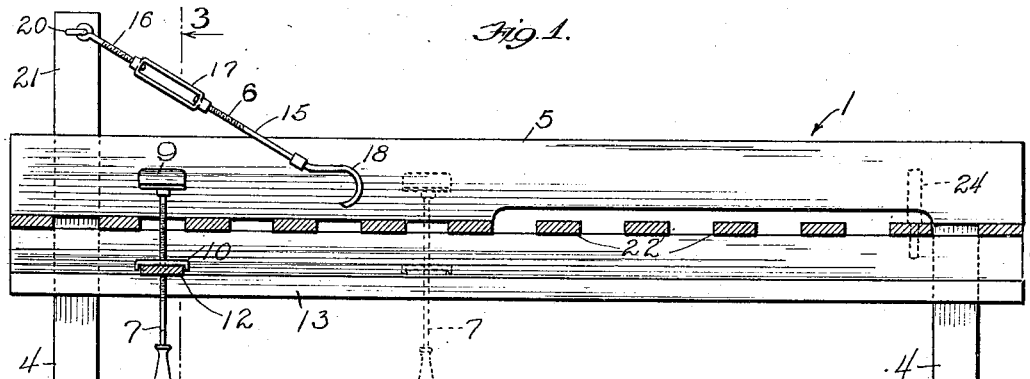
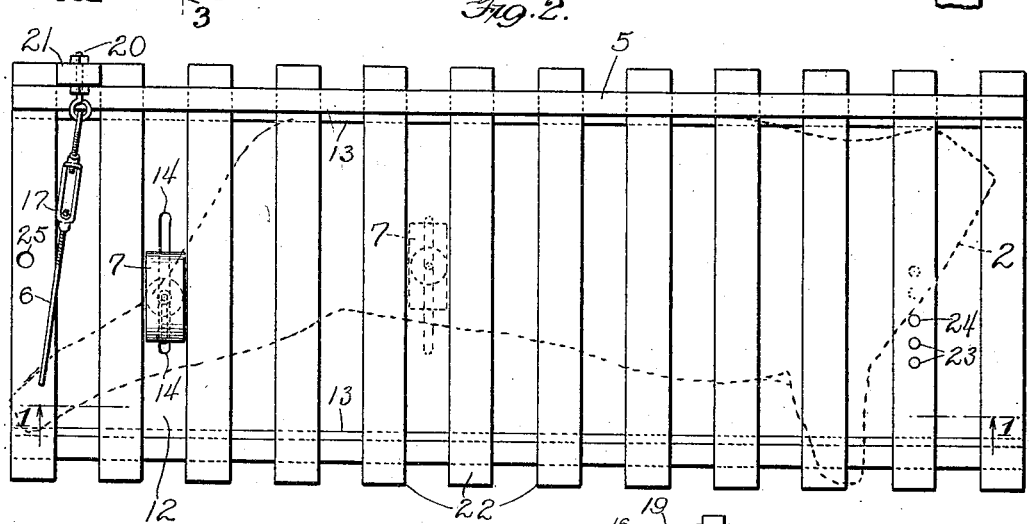
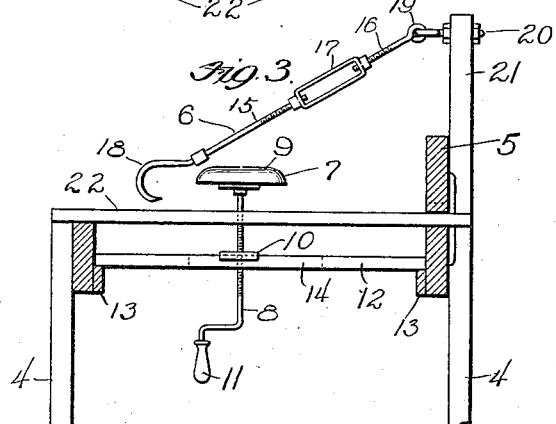
Inventors:
Paul Cyrus Smith.
John Clifton Agar.
Witness:
Martin H. Olsen Patented July 16, 1929.

1,721,139

UNITED STATES PATENT OFFICE.

PAUL CYRUS SMITH AND JOHN CLIFTON AGAR, OF CHICAGO, ILLINOIS, ASSIGNORS TO SWIFT & COMPANY, OF CHICAGO, ILLINOIS, A CORPORATION OF ILLINOIS.

BEEF-CHILLING RACK.

Application filed October 6, 1928. Serial No. 310,876.

This invention relates to the industrial treatment of food carcasses, pursuant to dressing the animals and during the chilling process; and more especially to the positioning and supporting of the individual sides of split carcasses while chilling and setting, particular reference being had to bovine animals and to sides of beef.

The main objects of this invention are to prevent appreciable distortion or stress in food carcasses, such as herein referred to, or to any parts thereof, during chilling and the concurrent setting of the muscles and tissues; to support and maintain the carcass, and especially the sides thereof when split apart, in about their natural position; to provide for thus supporting carcasses and especially sides of beef in a recumbent or horizontal position; to provide for holding the hind quarter in a somewhat or slightly rectified or alined position while chilling, but more nearly natural than when suspended by the hind leg; and to provide for maintaining the flank substantially in flush and symmetrical relation to the adjacent parts of the side; and to provide adjustable means for supporting the flank and rump respectively in the desired position.

An illustrative embodiment of this invention is shown by the accompanying drawings, in which:

Figure 1 is a sectional view of a rack or table adapted for supporting sides of beef bone, side down, while chilling.

Fig. 2 is a plan of the table shown in Fig. 1.

Fig. 3 is a cross-section on the line 3—3 of Fig. 1.

In the construction shown in the drawings the table 1 is adapted to receive a side of beef 2, indicated in dotted outline on Fig. 2, skinned side up. This table comprises mainly a flat slatted top 3, a supporting frame or leg structure, indicated at 4, a back member 5, tension means 6 for securing the hind leg of the carcass, and adjustable lift means 7, for supporting the flank.

The support 7 is of the nature of a jack-screw; and comprises a vertically disposed crank shaft 8, a flank bearing plate or head 9 pivoted to the upper end thereof, a central supporting plate 10 which is perforated and threaded to receive the main body part of shaft 8, a handle 11 on the offset lower end of shaft 8, and a longitudinally slotted cross bar 12 which is slidable lengthwise of the rack on the side rails 13, the plate 10 being slidably supported on said bar. The slot 14 in bar 12 is shown directly in Fig. 2 and by dotted lines in Fig. 3.

The operative position of the jack 7 is best shown by dotted lines in Figs. 1 and 2, a right side of beef being shown in dotted outline in the latter view.

The leg holder 6 comprises a pair of bolts 15 and 16 and a turnbuckle link 17 connecting the same, one of the bolts 15 having a hook 18 formed on its outer end and the other having an eye 19 held by the eye-bolt 20 in the corner post 21.

In using this device, a side of beef 2 is brought to the point for transfer to the chilling table by means of an overhead trolley, not shown; the beef being suspended vertically. A table 1 is then held hook end up and applied to the split or bone-side of the beef and then both are lowered and swung to a horizontal position, as shown in the drawings. The hind leg is then pulled back to a desirable position and there held by the adjustable tension hook 6, also the flank support or jack 7 is moved lengthwise of the table, and also crosswise if necessary, until properly adjusted for supporting the flank, whereupon it is elevated by turning the handle 11.

In placing the beef on the rack, the spinal part is disposed snugly against the straight frame back 5. The hook 6 serves to help hold the beef in this position. In order to facilitate securing the beef precisely in a desired position some or all of the slats 22 are perforated in several places as at 23 to receive pins 24 which may be adjusted as to position, according to the shape and size of the beef and the position desired. For convenience in handling the table and to enable ready support endwise from overhead, a trolley hook may be inserted at the "hind" end, as at 25.

When the table is loaded, it is placed in the chilling room or it may be kept there if it be preferred to load and unload it at that point. The table is normally kept horizontal, but if occasion arises, it may be moved, together with its load, in a vertical position, all suspended from the trolley.

As soon as the beef is chilled and set sufficiently, it is removed by reverse operation and carried on the overhead rail, not shown, to the storage room or refrigerator, where it is held ready for the market.

By this operation, the beef is set in about its natural position, or in a position which is most acceptable to the trade and which, therefore, commands the best price in the market.

Although but one specific embodiment of this invention is herein shown and described, it is to be understood that numerous details of the construction shown may be altered or omitted without departing from the spirit of the invention as defined by the following claims:

We claim:

1. A beef chilling table comprising a flat slatted top part, adapted to receive the bone side of a side of beef, supporting means therefor, an upright back member to receive the spinal part of the side, an adjustable tension member for securing the leg of the animal, and an adjustable support for the flank.

2. A chilling table for sides of beef comprising a planar top part to receive the bone side, a back supporting part, an adjustable leg holder, and an adjustable flank support adapted and arranged for various positioning, both lengthwise and crosswise of the table.

3. A chilling table for sides of beef comprising a planar top part to receive the bone side, and a vertically adjustable jack to support the flank.

4. A chilling table for sides of beef comprising a planar top part to receive the bone side, a vertically adjustable jack to support the flank, said jack comprising an upright threaded shaft with a pivoted bearing head at its upper end, a hand crank at its lower end and a threaded bearing plate disposed medially and supported on the table.

5. A beef chilling rack comprising a slatted top to receive the bone face of a side of beef, and a flank support adapted for universal adjustment, said top having its slats spaced apart sufficiently to admit said support for vertical projection according to need for registry with the flank.

6. A chilling rack to receive sides of beef bone face down, said rack comprising an openwork top, a pair of parallel guide rails beneath said top, a bar disposed crosswise thereof and resting at its ends thereon, and a vertically adjustable jack mounted thereon and slidable lengthwise thereof.

7. A beef chilling rack of the character described having an upstanding back to aline the spinal part of a beef side and a post at one end thereof equipped with an adjustable length tension member to restrain the hind leg.

8. A beef chilling rack of the character described having restraining means including an upstanding rear part having a long shanked hook pivoted thereto, the hook shank including a turnbuckle.

Signed at Chicago this 1st day of October, 1928.

PAUL C. SMITH.
J. C. AGAR.